Jan. 28, 1969

F. SCHPAK ET AL 3,423,886

METHOD OF MACHINING NON-RIGID CONTACT LENSES

Filed July 29, 1965

INVENTORS
FRED SCHPAK
JOSEPH L. BREGER
ROBERT H. WARNER

By Anderson, Luedeka, Fitch, Even & Tabin
Atty's

United States Patent Office
3,423,886
Patented Jan. 28, 1969

3,423,886
METHOD OF MACHINING NON-RIGID CONTACT LENSES
Fred Schpak, Skokie, and Joseph L. Breger and Robert H. Warner, Highland Park, Ill., assignors to Mueller Welt Contact Lenses, Inc., Chicago, Ill., a corporation of Illinois
Filed July 29, 1965, Ser. No. 475,727
U.S. Cl. 51—281
Int. Cl. B24b 9/14
6 Claims

ABSTRACT OF THE DISCLOSURE

A method of shaping the edge of a contact lens formed of a non-rigid material incident to contact between the lens and a forming element, comprising rotating the lens at a sufficiently high angular velocity that the centrifugal force produced within the peripheral edge portion of the lens creates within such portion internal stresses effective to neutralize stresses tending to be induced within such portion by the engagement of the peripheral edge portion by a forming element during the machining operation.

---

This invention relates to methods of machining articles and, more particularly, to methods of machining articles formed of non-rigid materials.

The machining of articles formed of a non-rigid material such as, for example, silicone rubber and, principally, the cutting, grinding, and polishing of such articles in a manner which will provide a relatively smooth surface, has heretofore been quite difficult. Such articles, particularly the surfaces thereof, have a tendency to flex, deform, or become otherwise distorted when engaged by the cutting tool. Since the shape of the article during machining greatly influences the effect of the forming element or tool on the article, the results of such machining are frequently inaccurate or otherwise unsatisfactory. When machining an article requiring a high degree of precision, e.g., a contact lens formed of a non-rigid material, referred to more fully hereinafter, such inaccuracy cannot be tolerated.

One method of machining objects formed of non-rigid materials has been to freeze the object to be machined with liquified or solid gasses, or by other refrigerating means, thus making the object more rigid and allowing the machining operation to be carried out with the material in a non-flexible state. However, the freezing point of many such materials is so low that freezing is quite difficult if not impractical. Furthermore, the friction caused by contact of the surface being machined with the work tool or abrasive causes sufficient heat to be generated to raise the temperature of the material in the immediate area of contact above the melting point, thereby returning the material to the non-rigid state and again giving rise to the problems previously mentioned. Attempts to compensate for the heat of friction by maintaining both the material and the tools at extremely low temperatures during the machining have been unsuccessful or considered to be impractical.

Also, such non-rigid materials frequently are rendered so rigid when frozen that they become friable and brittle, causing frequent breaking of the article. Even if the difficulty of maintaining the article at freezing temperatures were overcome, therefore, the freezing appoach would still be unsatisfactory.

Another method which has been proposed for machining an object formed of a non-rigid material is to sandwich the object between two pieces of a rigid material and machine the object while it is so held. In still another method which has been proposed, the object is encapsulated in a rigid medium, e.g., wax, and machined while it is encapsulated. Neither method, however, provides the accuracy which is desired in many applications, and hence, neither is acceptable for many applications.

It is the principal object of the present invention to provide an improved method of machining articles formed of non-rigid materials having a tendency to flex, or otherwise be deformed or distorted, during machining operations.

Another object of the present invention is to provide an improved method of machining with a high degree of accuracy articles formed of non-rigid materials.

An additional object of the present invention is to provide an improved method of machining turned surfaces on articles formed of non-rigid materials.

A further object of the invention is to provide an improved method of machining articles formed of non-rigid materials in an economical and efficient manner.

A still further object of the invention is to provide a method of machining turned surfaces on articles formed of non-rigid materials so as to produce extremely fine surface finishes thereon.

Further objects and advantages of the invention will become apparent with reference to the following description and the accompanying drawing.

Figure 1:
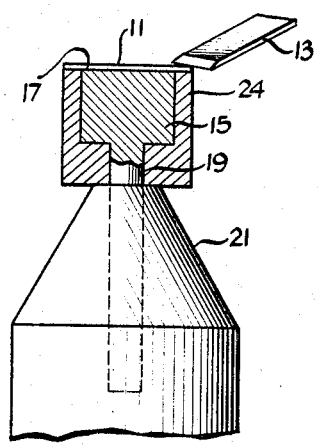
FIGURE 1 is a fragmentary elevational view, partially in section, depicting by way of example one step in a machining operation in which various of the features of the invention might be employed to produce a turned surface on a contact lens formed of a non-rigid material.

Non-rigid materials of the type referred to have many and varied uses. In numerous instances, the application to which the material is put requires the production of very accurately turned surfaces thereon. An example of such an application is described in U.S. Patent No. 3,228,-741, issued Jan. 11, 1966, wherein hydrocarbon substituted polysiloxane rubber is used to form a corneal contact lens. This material is quite flexible and relatively soft and may be easily distorted by application of a slight force thereto. The properties of the material are such, however, that when the distorting force is removed, the lens will return to its original molded shape.

In the manufacture of contact lenses made of this material, it is desirable to mold the lenses in standard configurations which provide the desired corneal curvatures and optical qualities, and to thereafter "size" or fit the lens to the particular person for whom it is being made. This is accomplished by machining the exterior periphery or edge of the lens in several separate steps including cutting, polishing, and ultimately burnishing the machined surface to produce the necessary transparency and to remove all machining or tool marks which might otherwise impair its fitting characteristics.

The present invention is particularly adapted to the provision of turned surfaces on articles formed of a non-rigid material. To facilitate a clear understanding of the invention, it will be hereinafter described as applied to the machining of the peripheral edge portion of a concavo-convex contact lens 11 formed of hydrocarbon substituted polysiloxane rubber, as referred to above. However, it should be understood that the method of the invention has other applications and that the specific application set forth is intended to be illustrative only.

Very generally, the machining of the contact lens 11 is accomplished by removal of material from the peripheral edge portion thereof incident to engagement between the lens and a forming element 13 which, in the illustrated embodiment, is in the form of a cutting blade. However, it is to be understood that the forming element 13 might also be in the form of a grinding wheel, a file, sandpaper, or various burnishing materials including a material the same as that from which the article being machined is formed. The material of which the lens 11 is formed (e.g., silicone rubber) is such that the cutting force which would have to be exerted by the cutting tool to effect removal of material from a surface of the lens if the lens were held in a stationary position or rotated at a relatively low speed, as in conventional machining techniques, would cause deformation or flexing of the surface being machined, making the desired degree of accuracy very difficult if not impossible to achieve by conventional methods.

In accordance with the method of the present invention, as illustrated in the drawing, the lens 11 is, in effect, pre-stressed; i.e., prior to contact by a forming element stresses are set up within the peripheral edge portions of the lens which are in opposition to, and greater than, the stress which would otherwise be set up within those portions incident to the machining and which would, absent such pre-stressing, cause deformation and distortion of the lens. The pre-stressing is accomplished by rotating the lens at a sufficiently high angular velocity to produce a centrifugal force within the peripheral edge portion of the lens capable of creating within such portion the desired internal stresses. These stresses being greater than, and in opposition to, the stresses tending to be induced within such portion by the engagement of the portion by a forming element during the machining operation, in effect, neutralize such induced stresses. These induced stresses, if not neutralized, would cause the peripheral edge portions to become distorted or otherwise undergo strain during the machining. Because of the pre-stressing, however, as occasioned by the centrifugal force, the effective or net stress within the lens is outward rather than inward so that distortion or strain as a result of the machining does not occur.

More specifically, rotation of the lens 11 is preferably accomplished by securing the lens to, and rotating it on, a support member 15 which, as illustrated, is in the form of a solid cylinder having a flat planar surface 17 at one end and having an elongated stem 19 projecting from the opposite end in coaxial relation thereto to facilitate mounting of the support within a chuck 21. The diameter of the surface 17 is somewhat less than the diameter of the lens 11.

Because of the flexible nature of the material of which the lens 11 is formed, it can be easily caused to conform to the upper surface of the support 15 and, when this upper surface is flat as in the illustrated embodiment, can be easily caused to assume a flattened condition. However, the lens can also be caused to conform to a convex or concave surface if the upper end of the support is provided with such. The lens is preferably secured to the support 15 of the illustrated embodiment by bonding the concave surface of the lens to the flat planar surface 17 of the support. When so located, the central portion of the lens is generally flat. The edge portions, however, overhang the rim of the support because of the difference in the diameters of the lens and the surface 17 and may, when the support is stationary, curve downwardly or upwardly slightly over the rim. These edge portions become planar when the support is rotated at a high speed.

Bonding of the lens 11 to the surface 17 of the support is preferably accomplished by means of a pressure-sensitive silicone adhesive which is cured by placing the adhesive on the mount in an oven maintained at approximately 350° F. for 40 minutes. When such an adhesive is used, the lens can be easily separated from the mount after machining by means of a simple tool, and any residue remaining on the lens or mount can be easily removed by the use of a solvent so as not to impair the optical properties of the lens or reduce its transparency.

Typical contact lenses made of the silicone rubber material described in the abovementioned application range in thickness from .002″ to .050″ and are of a maximum diameter ranging from 6 millimeters to 14 millimeters. The support 15 may be constructed so that the flat planar surface 17 will accommodate a portion of the range of lens sizes.

After the lens has been bonded to the flat planar surface 17 in the manner previously described, the stem 19 is locked within the chuck 21 and the chuck is then rotated, as by an air turbine motor (not shown), at an angular velocity sufficiently high to produce a centrifugal force within the peripheral edge portion of the lens capable of creating internal stresses within such edge portion opposite to and greater than the stresses tending to be induced within such portion by a forming element during a machining operation. Thus, the lens is, in effect, pre-stressed to prevent distortion or strain within the peripheral edge portion of the lens during machining.

It has been found that for lenses of the size and material described, rotational speeds above 35,000 revolutions per minute satisfactorily produce the centrifugal forces necessary to allow shaping of the lens without distortion. Speeds in the range of 40,000 to 60,000 revolutions per minute are found to be most satisfactory. At speeds below 35,000 revolutions per minute, the centrifugal force produced may be insufficient and distortion of the lens may occur. The maximum speed used must, however, also be controlled so as to prevent damage to the lens by exceeding the elastic limit of the material. Speeds up to 200,000 revolutions per minute are considered practical.

As previously mentioned, the forming tool 13 may be in various forms such as a knife, a rough cloth or paper, or a smooth material such as the material being machined. When the forming tool is in the form of a knife, it is preferably constructed of steel and is rigid and sharp. The plane of the cutting tool is preferably positioned with respect to the surface of the lens to be machined at an angle of approximately 6° with respect to the tangent plane passing through the line of contact of the tool with the lens.

Figure 2:
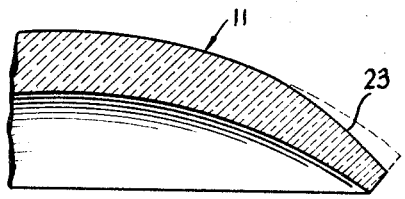
FIGURE 2 is a enlarged fragmentary sectional view of a portion of the lens shown in FIGURE 1.

With the lens secured to the support 15 and with the support and lens rotating at the proper velocity, the forming tool 13 is placed in contact with the lens to form a flat surface 23 (FIG. 2) on the normally convex surface of the lens. During this and other subsequent forming steps the use of a lubricant has been found to provide the finished lens with a greater smoothness, a higher sheen and a greater polish.

In the machining of the upper surface of the lens, it may be desirable, although not essential, to support from beneath that portion of the edge of the lens which projects past and overhangs the side wall of the support member. When this is desired, a sleeve 24 such as is shown in FIGURE 1 may be employed. The sleeve is removed for machining of the lower surface of the lens, as hereinafter described.

Figure 3:
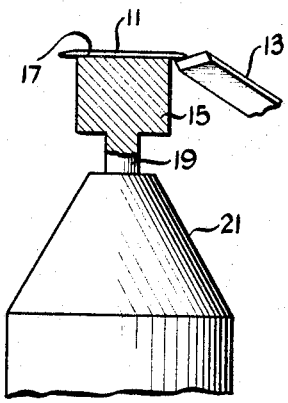
FIGURE 3 is a fragmentary elevational view, partially in section, depicting another step in a machining operation in which various of the features of the invention might be employed to produce a turned surface on a contact lens formed of a non-rigid material.
Figure 4:
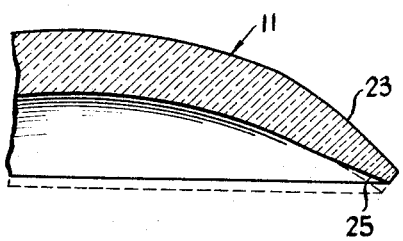
FIGURE 4 is an enlarged fragmentary sectional view of a portion of the lens shown in FIGURE 3.
Figure 5:
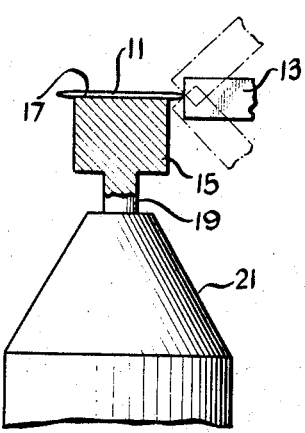
FIGURE 5 is a fragmentary elevational view, partially in section, depicting still another step in a machining operation in which various of the features of the invention might be employed to produce a turned surface on a contact lens formed of a non-rigid material.
Figure 6:
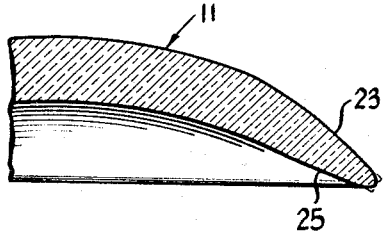
FIGURE 6 is an enlarged fragmentary sectional view of a portion of the lens shown in FIGURE 5.

After the upper surface of the lens has been machined, the tool is placed in contact with the underside of the peripheral portion of the lens (FIG. 3) to produce the turned surface 25 best seen in FIGURE 4. After the surfaces 23 and 25 are formed, the rim of the lens may be appropriately rounded with a hand-held file, sandpaper, or the like (FIG. 5) to provide a smooth transition portion which will reduce the possibility of irritation to the eye.

Subsequent to each of the aforementioned machining operations, the turned surface produced may be further finished to insure the transparency necessary to the optical properties of the lens. This may be accomplished by polishing of the surfaces with hand-held emery paper or the like, followed by burnishing of the surface with a piece of material of the type from which the lens is formed.

As can be appreciated, a method has been provided which can be utilized to produce accurately machine turned surfaces upon articles formed of nonrigid, flexible elastic materials. While the invention has been described with respect to a preferred method as employed to machine a specific article, namely, contact lenses, it should be apparent that various variations of the preferred method might be employed, and that the method has application to the machining of articles and materials other than those disclosed by way of example. Various features of the invention are set forth in the following claims:

What is claimed is:

1. A method of shaping a thin flexible lens formed of a flexible material by contact with a forming element, which method comprises releasably securing the lens to a rotatable support member with the center of the lens lying on the axis of rotation of the support member, rotating the support member and lens at a sufficiently high angular velocity so that the centrifugal force produced on the peripheral edge portion of the lens causes the lens to become sufficiently rigid to permit the forming element to readily form the peripheral edge portion of the lens when brought in contact therewith, and effecting such contact between the peripheral edge portion of the lens and the forming element while the lens is rotated at such angular velocity.

2. A method in accordance with claim 7 wherein the lens is substantially flattened in a plane when it is secured to said rotatable support member.

3. A method in accordance with claim 1 wherein the lens is formed of hydrocarbon substituted polysiloxane rubber.

4. A method in accordance with claim 1 wherein the support member and lens are rotated at an angular velocity of between 35,000 and 200,000 revolutions per minute.

5. A method in accordance with claim 1 wherein the lens is releasably secured to the support member by means of a pressure sensitive, overcured silicone adhesive.

6. A method in accordance with claim 1 wherein one end of the support member is circular and of a diameter less than the diameter of the lens so that the end portions of the lens project past the periphery of the support member when the lens is secured thereto.

References Cited

UNITED STATES PATENTS

| | | | |
|---|---|---|---|
| 2,675,073 | 4/1954 | Constantakis | 82—1 |
| 3,112,581 | 12/1963 | Hoffman | 51—284 |
| 3,145,506 | 8/1964 | Vegors et al. | 51—284 |

LESTER M. SWINGLE, *Primary Examiner.*

U.S. Cl. X.R.

82—1